United States Patent Office 3,418,487
Patented Dec. 24, 1968

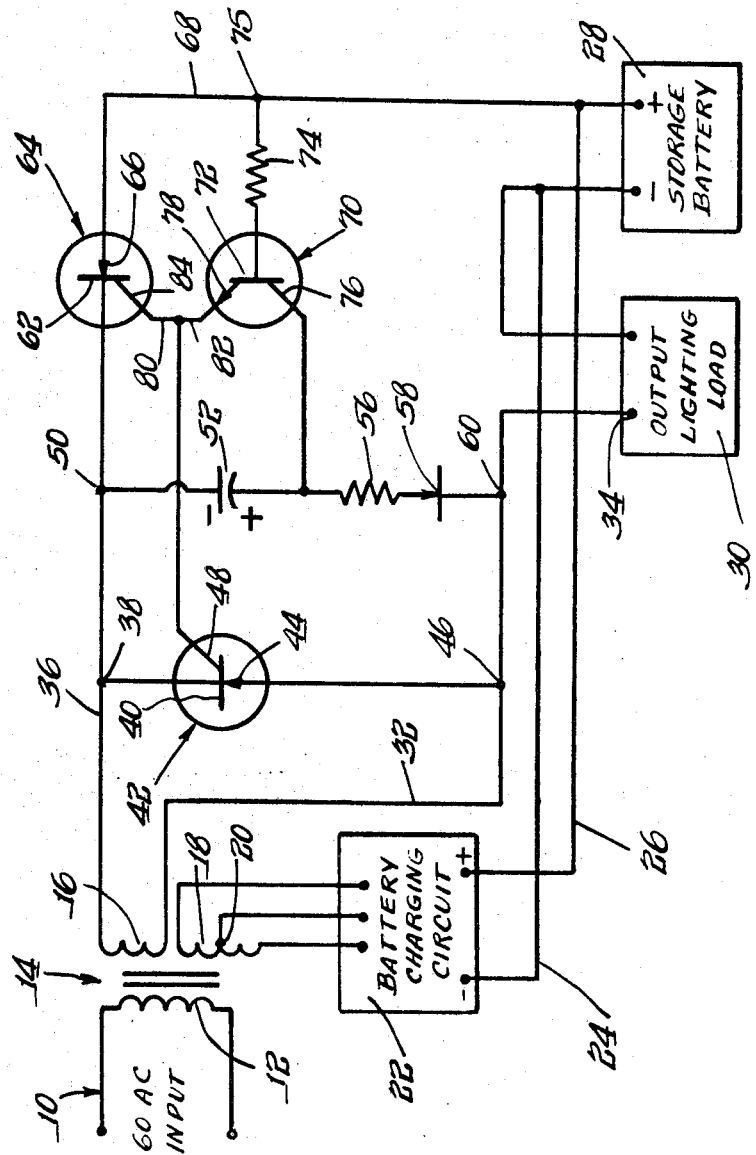

3,418,487
EMERGENCY POWER SUPPLY SYSTEM
John D. Livingston, Crystal Lake, Ill., assignor to U-C-Lite Manufacturing Company, Crystal Lake, Ill., a corporation of Delaware
Filed May 25, 1966, Ser. No. 552,935
6 Claims. (Cl. 307—66)

This invention relates to an emergency or standby lighting system devoid of relay coils or moving parts, being completely solid state in nature.

At the present time, most electric lighting systems are fed from a network of alternating current electric lines connected with commercial or government power-generating or supplying stations. From time to time there are power failures, sometimes due to electrical or other storms, and sometimes due to malfunctioning of various parts of the power system or generating equipment. With the complex network of electrical supply now prevalent in the United States such power failures can be geographically quite extensive. It will be recognized immediately that there are many areas in which lack of electric power simply cannot be tolerated. For example, in hospitals, particularly in operating rooms, in law enforcement agencies, in communications centers, in military headquarters, etc., it is unthinkable that any substantial time could be allowed to elapse without light. Accordingly, it heretofore has been proposed to provide emergency lighting systems.

Prior art emergency lighting systems have sometimes included auxiliary generating equipment. There have also been low-voltage systems operable from storage batteries. It has been the practice to maintain the storage batteries continuously charged from the alternating current supply lines. Upon failure of the supply lines for one reason or another, provision has been made for manually switching on the auxiliary lighting system, or in some instances provision has been made for automatic switching. Such automatic switching has entailed the use of relays with holding coils and with electromechanically operated contacts. Such systems have had various drawbacks. For example, coils which have been energized for a long time tend to saturate the magnetic structure to the point that a relay may not drop out for some time after the current goes off. Furthermore, it has in most instances been necessary to provide rectified direct current for operating the relays, since alternating current relays tend to hum and chatter, and sometimes to allow partial opening of contacts with concomitant sparking and burning thereof. Furthermore, conventional relay contacts are subject to oxidation, collection of dirt, electrical erosion and deposition, etc., all of which tend to make the contacts somewhat unreliable.

Accordingly, it is an object of the present invention to provide an emergency lighting system having solid state controls.

Furthermore, it is an object of the present invention to provide an emergency lighting system controlled by semiconductor devices, specifically a combination of one or more silicon controlled rectifiers, transistors, and diodes.

Other and further objects and advantages of the present invention will be apparent from the following description when taken in connection with the accompanying drawing comprising a schematic wiring diagram of the invention.

Referring now in greater detail to the drawing, there is shown a conventional A.C. line 10 connected as an input to the primary winding 12 of a transformer 14. The transformer has two secondary windings 16 and 18, the latter being center-tapped at 20. The transformer secondary winding 18 is connected to a battery-charging circuit 22 which comprises a full wave rectifier of known design, utilizing solid state rectifier elements. The battery-charging circuit has negative and positive output terminals respectively connected by wires 24 and 26 to the like terminals of a storage battery 28, whereby at all times to maintain the storage battery 28 charged. As will be appreciated, the storage battery has a potential related to the output lighting load 30, and the potential of the output of the battery-charging circuit 22 is properly correlated therewith. For example, a 6 volt storage battery would be used with a 6 volt output lighting load, and this could easily be 12, 24, or any other ordinary or well-known D.C. voltage.

The output winding 16 of the transformer 14 has an output line 32 connected to one terminal 34 of the output lighting load. It will be understood that although the output load is typically a lighting load, it could be a different type of electric load. The winding 16 has a second output line 36. This line has a junction 38 connected to the cathode 40 of a silicon-controlled rectifier 42, conventionally referred to as an "SCR." The anode 44 thereof is connected to a junction 46 on the line 32. The SCR 42 also has a gate 48, and the connection thereof will be set forth shortly.

A second junction 50 is provided on the line 36, and a capacitor 52 has one side thereof connected to this junction. The other side of the capacitor 52 is connected to a junction 54. This junction in turn is connected through a resistor 56 to a diode 58. The other side of the diode is connected to a junction 60 on the line 32. The diode 58 is poled as shown, so as to conduct current in the conventional sense from top to bottom.

The junction 50 further is connected to the cathode 62 of an SCR 64. The anode 66 of the SCR 64 is connected to a line 68 leading to the line 26 and to the positive terminal of the storage battery 28.

The transistor 70 has the base 72 thereof connected through a resistor 74 to a junction 75 on the line 68. The collector 76 is connected to the junction 54, while the emitter 78 is connected to a line 80 having a junction 82. The junction 82 is connected to the first SCR gate 48, while the line 80 is connected to the gate 84 of the second SCR.

When the primary winding 12 of the transformer 14 is energized with the usual 110–120 v. 60 cycle A.C. potential, the secondary winding 16 has an output of 8 v. A.C. open circuit voltage. This 8 v. A.C. potential inversely charges the capacitor 52 to saturation through resistor 56 and diode 58. The top of the capacitor 52 is charged negative and the bottom is charged positive, as indicated in the drawing. The positive charge or current is applied to the collector 76 of the transistor 70, thereby biasing the transistor against conduction.

Both of the SCR's remain open or non-conductive as long as the SCR's have a negative gate and the 8 v. A.C. from the secondary winding 16 is applied to their cathodes. Whenever this 8 v. A.C. fails, through failure of the input supply line 10, or possibly through failure of the transformer 14 itself, the capacitor 52 discharges through resistor 56, diode 58, and secondary winding 16. The positive blocking current applied to the transistor collector 76 thus is dissipated, and transistor 70 will conduct positive current from the battery 28 through the resistor 74 to the base 72 and thus to the emitter 78.

This positive battery current is applied to the gates of both silicon controlled rectifiers 42 and 64, thus causing both to close and 64 to conduct. The positive battery current thus flows through line 68 and SCR 64 from anode 66 to cathode 62, and from thence through line 36, secondary winding 16, line 32 to the terminal 34 of the output lighting load. The other terminal is simply returned to the storage battery 28 as shown. The output lighting load is thus energized.

When the A.C. input power is restored, the secondary winding 16 produces an induction surge that is suppressed or absorbed by SCR 42. This SCR, like the second SCR 64, quickly opens or becomes non-conductive as negative current is applied to the gates and A.C. is applied to the cathodes.

The SCR's can be of widely varying types and value, and the rating of the SCR 64 depends on the output lighting load. For example, for a 25 ampere lighting load, SCR 64 must have a forward or "on" amperage rating of at least 25 amperes RMS. The greater the output load amperage, the larger heat sink required for the SCR 64. No heat sink is required for SCR 42 or transistor 70.

In view of the alternating current transients which must be withstood, SCR 64 must have a voltage rating at least twice the voltage of storage battery 28. Other components are not particularly critical as to value, but certain recommended constants are set forth as follows:

| | |
|---|---|
| SCR 44 | Type C106F2. |
| SCR 64 | Type C30F. |
| Capacitor 52 | 100 mfd. 15 v. |
| Resistor 56 | 100 ohms, ¼ watt. |
| Resistor 74 | 330 ohms, ¼ watt. |
| Diode 58 | Type A13FX9. |
| Transistor 70 | Type 2N2711. |

Preferably the entire unit except for the transformer, the storage battery, the battery charging circuit and the output lighting load is encapsulated in an epoxy or other suitable resin which will seal the unit and which will aid in dissipation of heat from SCR 64.

It will now be apparent that an improved emergency or standby control circuit has been presented which is entirely of solid state construction, avoiding the use of powered robbing coils and moving parts. The specific example set forth is for illustrative purposes only, and various changes will doubtless occur to those skilled in the art. Such changes form a part of the present invention insofar as they fall within the spirit and scope of the appended claims.

The invention is claimed as follows:

1. An emergency power supply system for connection to an A.C. input circuit, an output load and battery means, comprising A.C. input means for connection to an A.C. input circuit, a solid state controlled rectifier device connected on one side to said A.C. input means, battery connecting means connected to the other side of said rectifier device and adapted for connection to one terminal of said battery means, means for connecting the other terminal of said battery means and one terminal of an output load, means connected to said A.C. input means and adapted to be connected to said output load, there thereby being a series circuit comprising said solid state controlled rectifier device, said battery means, said output load and said A.C. input means, and biasing means normally biasing said solid state controlled rectifier means off whereby said series circuit is normally open, but biasing said solid state controlled rectifier means upon failure of supply of alternating current to said A.C. input means to complete said series circuit and energize said output load from said battery means, said biasing means further including capacitor means and unilaterally conducting means interconnected with one another and connected to said A.C. input means and further connected to said solid state controlled rectifier device.

2. A system as set forth in claim 1, wherein said unilaterally conductive means comprises a diode.

3. A system as set forth in claim 2 and further including a transistor connected to said diode means and said capacitor means and further connected to said solid state controlled rectifier device.

4. A system as set forth in claim 1, wherein said solid state controlled rectifier device comprises a silicon controlled rectifier.

5. A system as set forth in claim 1, and further including a second solid state controlled rectifier device connected across said A.C. input means, each of said devices having a gate, and wherein said biasing means is connected to both gates.

6. A system as set forth in claim 5 and further including a transistor connected to said rectifier means and to said unilaterally connecting means and further connected to both of said gates.

References Cited

UNITED STATES PATENTS

| | | | |
|---|---|---|---|
| 3,049,623 | 8/1962 | Du Vall | 307—66 |
| 3,159,755 | 12/1964 | Duncan | 307—88.5 |
| 3,179,871 | 4/1965 | Bagno | 320—30 |
| 3,255,398 | 6/1966 | Bagno | 320—5 |
| 3,308,306 | 3/1967 | Bagno | 307—66 |
| 3,319,074 | 5/1967 | Koch | 307—66 |

ROBERT K. SCHAEFER, *Primary Examiner.*

H. HOHAUSER, *Assistant Examiner.*

U.S. Cl. X.R.

320—5, 14